March 16, 1954 A. C. ANDERSEN 2,672,083
FURROW CHECKER
Filed Feb. 19, 1951 4 Sheets-Sheet 1

ARTHUR C. ANDERSEN
INVENTOR
HUEBNER, BEEHLER,
WORREL & HERZIG
ATTORNEYS

March 16, 1954  A. C. ANDERSEN  2,672,083
FURROW CHECKER

Filed Feb. 19, 1951  4 Sheets-Sheet 2

ARTHUR C. ANDERSEN
INVENTOR
HUEBNER, BEEHLER,
WORREL & HERZIG
ATTORNEYS

March 16, 1954  A. C. ANDERSEN  2,672,083
FURROW CHECKER
Filed Feb. 19, 1951  4 Sheets-Sheet 3

ARTHUR C. ANDERSEN
INVENTOR
HUEBNER, BEEHLER,
WORREL & HERZIG
ATTORNEYS

March 16, 1954 A. C. ANDERSEN 2,672,083
FURROW CHECKER
Filed Feb. 19, 1951 4 Sheets-Sheet 4

ARTHUR C. ANDERSEN
INVENTOR
HUEBNER, BEEHLER,
WORREL & HERZIG
ATTORNEYS

Patented Mar. 16, 1954

2,672,083

UNITED STATES PATENT OFFICE 2,672,083

FURROW CHECKER

Arthur C. Andersen, Selma, Calif.

Application February 19, 1951, Serial No. 211,691

6 Claims. (Cl. 97—55)

The present invention relates generally to agricultural implements and more particularly to an improved furrow checker.

In the irrigation of grapevines in a vineyard and other agricultural crops planted in spaced parallel rows, furrows are formed lengthwise between the vine rows for the flow of water therealong. When the land is level the furrows are continuous the full length of the vine rows but when the land is sloped the furrows are generally required to be of zigzag form in order to achieve adequate soil penetration by the water. Such furrows are usually provided by first establishing elongated furrows and forming checks or dams periodically across the furrows to retard the flow of water therealong. Not only are checks formed across the furrows but the furrows are cut so that the water follows a zigzag pattern as it flows in an advancing reciprocal path.

Conventionally two furrows are formed between each vine row with a ridge of soil therebetween. A check is formed by dropping accumulated soil in alternate furrows so that elongated water pockets are formed in each furrow of substantially equal length but overlapping in opposite furrows by approximately half their length. It is the conventional practice to cut the ridge between the furrows on the downhill side of each check. Thus water directed down either furrow successively fills the elongated pockets of each furrow.

Heretofore, no implement of general acceptance adapted for manipulation from a draft appliance such as a tractor has been devised for accomplishing completely checked furrows while descending and ascending sloped terrain. It has been the general practice first to form the furrows with a furrowing implement and thereafter to check the furrows and cut the ridge therebetween with a shovel or other tool. Therefore, the forming of checked and cut furrows has been a time and labor consuming task in vineyards planted on sloped or rolling land.

It is an object of the present invention to provide an agricultural implement in the form of a furrow checker adapted to perform its intended function with equal facility when ascending or descending sloped terrain.

Another object is to provide a furrow checker by the employment of which both checked and cross cut furrows may be formed.

Another object is to provide a furrow checker with which the cross cut between furrows may be made on the downhill side of each check regardless of the direction of forward movement of the implement in traversing inclined areas.

Further objects are to provide improved elements and arrangements thereof in a device of the character and for the purposes set forth.

Still further objects and advantages will become apparent in the subsequent description in the specification.

Referring to the drawings.

Figure 1:
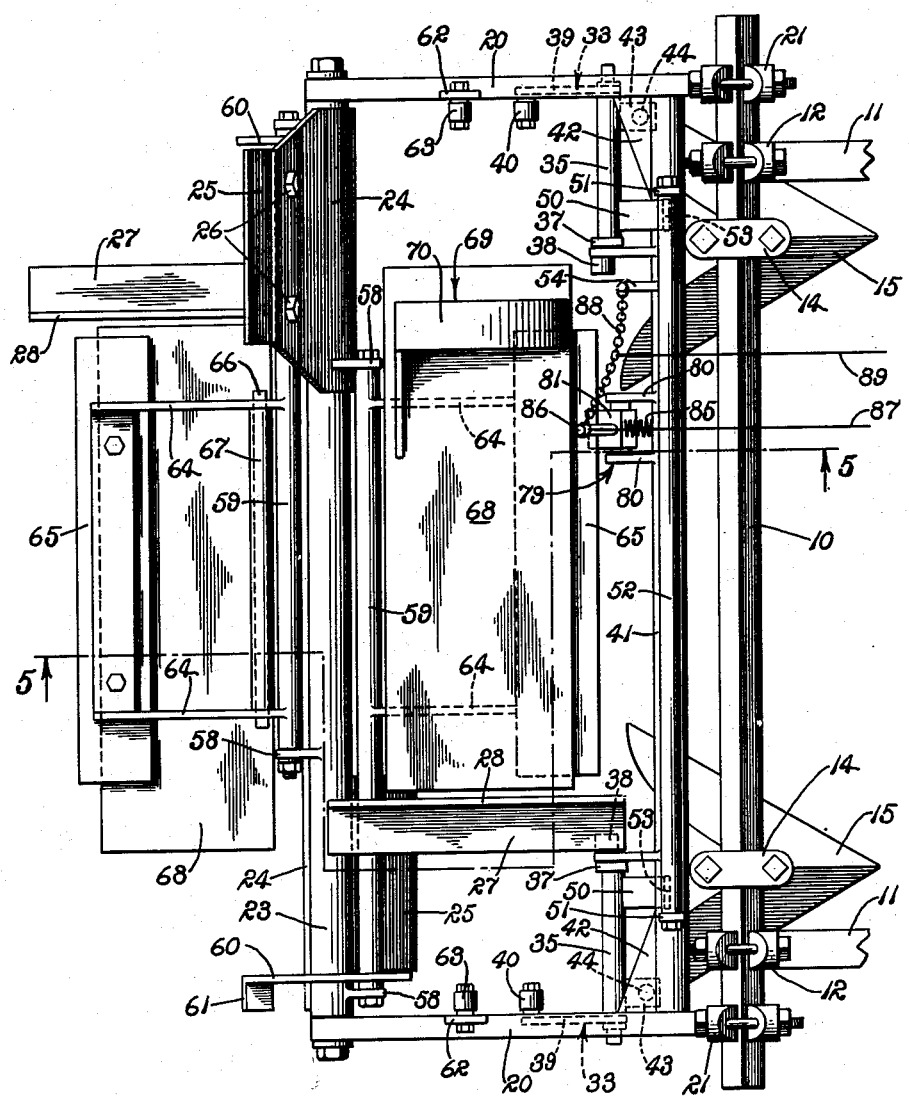
Fig. 1 is a top plan view of a furrow checker constructed in accordance with the principles of my invention.
Figure 5:
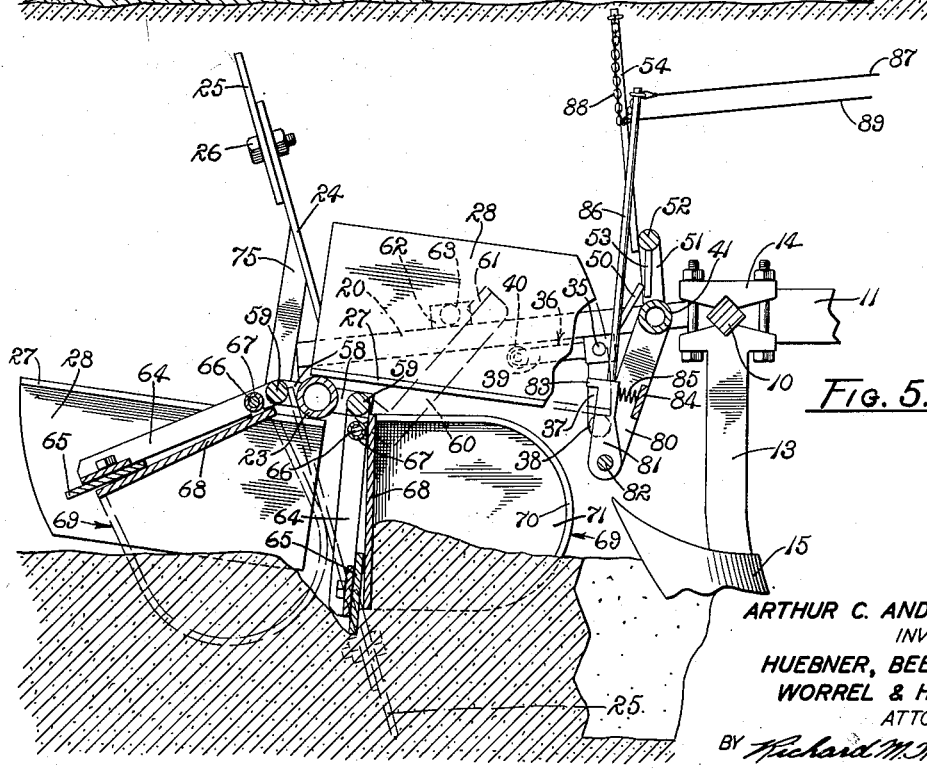

Fig. 5 is a vertical longitudinal section through the implement, as taken along line 5—5 in Fig. 1, but adjusted with one check forming blade latched against rotation and with the cross cut blade released and gravitated pivotally downwardly in engagement with the stationary check forming blade initiating the scraping of a cross cut on the approached downhill side of a check thereafter to be deposited in a furrow as when the implement is advancing upwardly of an incline.

Figure 6:
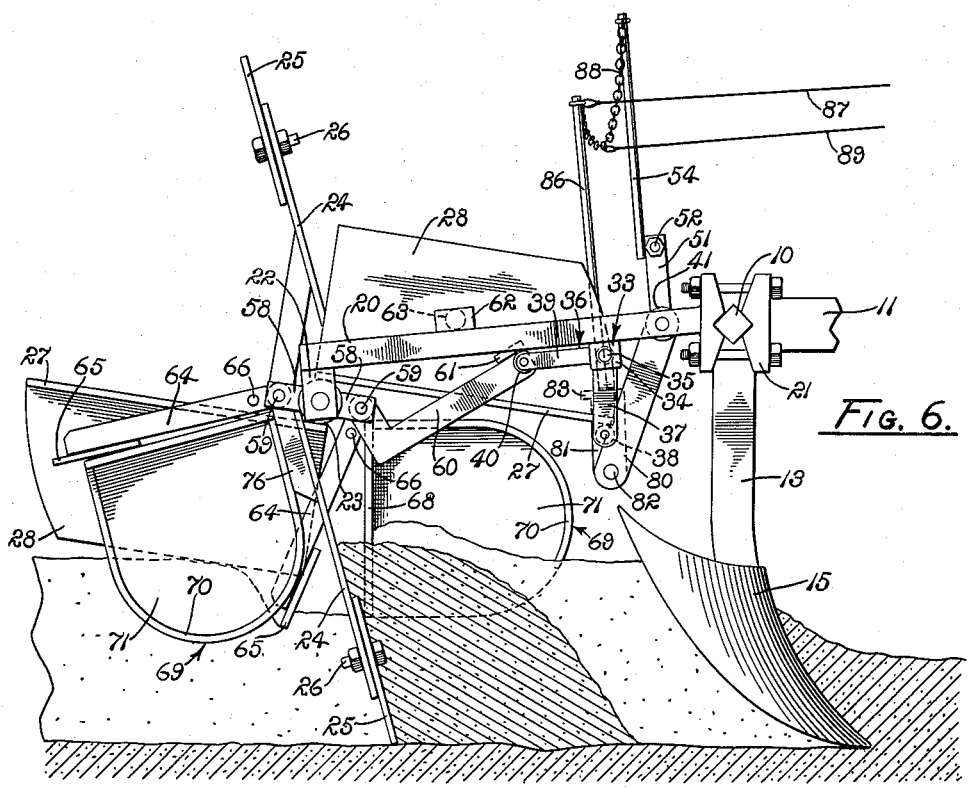

Fig. 6 is a side elevation of the furrow checker in an advance position in its cycle of operation as compared to the position shown in Fig. 5 showing the cross cut partially formed by the cross cut forming blade and the check forming blade about to be tripped by detention of a portion of the cross cut forming mechanism.

Figure 7:
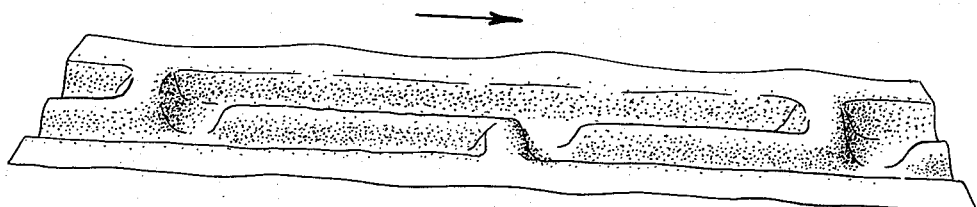

Fig. 7 is a view of an inclined area which is sloped downwardly to the right, as viewed, illustrating the formation of cross cuts between furrows at the far side of checks formed therein, as when the furrow checker is motivated downwardly to the right.

Figure 8:
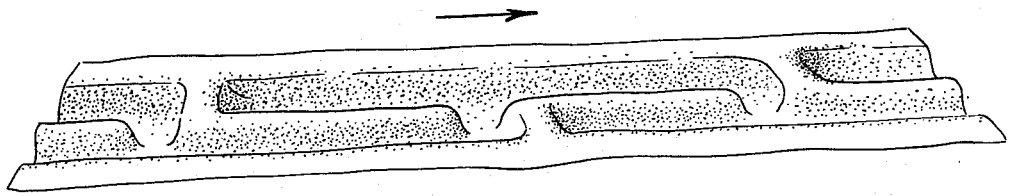

Fig. 8 is a view similar to Fig. 7 illustrating the formation of cross cuts on the near side of checks formed in furrows as when the implement is advanced upwardly to the right of the inclined area.

Referring in greater detail to the drawings:

The furrow checking agricultural implement of the present invention includes an elongated tool bar 10 which is square in cross section and is mounted at the rear end of a pair of supports 11 by means of clamps 12. The support 11 may be a rearward portion of a tractor, trailer or carryall which is adapted to support the tool bar and to provide forward movement therefor transversely of its length. A pair of adjacent furrows are formed on forward movement of the tool bar by providing a pair of shanks 13 which are secured to the tool bar in spaced relation thereon by means of a clamp 14 on each of the shanks. A furrowing shovel 15 of conventional form is attached to the lower end of each shank 13 so that a pair of adjacent furrows are formed with a ridge therebetween on forward motion of the shovels.

Each of a pair of elongated support arms 20 is provided with a clamp 21 at its forward end for attachment to the tool bar 10 adjacent to the terminal ends of the tool bar. The tool bar 10, the support 11 and the support arms 20 provide a supporting structure on which the actuating and effective members of the furrow checkers are mounted. The support arms 20 extend substantially horizontally and rearwardly from the tool bar 10 each being provided with a journal 22 at its rearward end. An axle 23, preferably of tubular form, is rotatably mounted in the journals 22 in an elevated attitude transversely of the forward directional movement of the device and axially parallel to the tool bar 10.

A pair of check scraper plates 24 are attached as by welding at their inner edges tangentially of the axle 23 and extend oppositely outwardly therefrom. A removable and replaceable check scraper blade 25 is attached, as by bolts 26, to the outer end of each of the check scraper plates 24 and at the forward side thereof when the blades are extending downwardly in scraping position. The edges of the check scraper blades 25 extend outwardly from the axle and terminate at equal distances therefrom and at a radial distance such that when the check scraper blades 25 extend downwardly in scraping position are located at substantially the same horizontal level as the lower ends of the furrowing shovels 15.

A pair of check scraper latch plates 27 are welded at their inner ends tangentially to the axle 23 and extend oppositely outwardly from the axle substantially midway between the check scraper blades 25. The check scraper latch plates 27 extend radially from the axle an appreciable distance so that the outer end of either of the latch plates may be retained to hold its respective check scraper blade in downward scraping position. Each check scraper latch plate 27 is reenforced or stiffened by means of a divider plate 28 which is welded to one edge of each of the latch plates and is extended perpendicularly thereto radially of the axle and rearwardly of the direction of rotative movement of the axle.

Each of the check scraper blades 25 are alternately maintained in a downwardly and slightly forwardly angled position from the axle for the purpose of scraping a quantity of soil from its respective furrow to be deposited in the form of a check across a furrow by providing a pair of check scraper latch mechanisms 33 which engage the outer ends of the check scraper latch plates 27 alternately to hold their respective check scraper blades 25 in scraping position. Each check scraper latch mechanism 33 comprises a check latch journal 34 attached to the under side of each of the support arms 20. A check latch pivot pin 35 is rotatably mounted in each check latch journal on which a bell crank latch member 36 is attached extending in a plane longitudinally of the furrow checker. Each bell crank 36 is formed with a dependent leg 27 having a retaining roller 38 secured rotatably to its lower end and a rearwardly horizontally extending leg 39 having a release roller 40 rotatably mounted at its terminal end.

A mounting rod 41 is rigidly mounted between the support arms 20 parallel to and slightly rearwardly of the tool bar 10. A gusset plate 42 is welded into the juncture between the mounting rod at each end and the support arms to reenforce the joint therebetween. A projection 43 extends horizontally forwardly from each bell crank 36 with a helical compression spring 44 located under initial compression between each projection 43 and each gusset 42 which urges each bell crank in a clockwise direction as viewed in Figs. 2 to 6 of the drawings or in a downward rearward direction. The urging of the spring maintains each retaining roller 38 rearwardly in the path of the outer ends of the check scraper latch plates 27 so that as the check scraper blades and the check scraper latch plates 27 rotate on the axle 23, one of the check scraper latch plates 27 engages one of the retaining rollers to maintain its respective check scraper blade 25 in a downwardly slightly forwardly extending scraping position.

The check scraper latch mechanism 33 is manually releasable by providing an actuating arm 50 secured to and extending upwardly and forwardly from each bell crank 36. A pair of spaced shaft supports 51 extend rigidly upwardly from the mounting rod 41 in spaced relation thereon with a rock shaft 52 rotatably mounted therebetween. An actuating finger 53 is secured to and extends radially downwardly from the rock shaft 52 in engagement with each of the actuating arms 50. A check blade trip rod 54 is weldably secured at its lower end to the rock shaft 52 and extends radially upwardly therefrom so that on manual forward pivotal movement of the trip rod the bell crank 36 is rotated to release a check scraper latch plate 27 from the retaining roller 38 which permits the axle and the check scraper blades 25 thereon to rotate in ground engagement on forward motion of the furrow checker.

Two pairs of ears 58 are weldably secured to the axle 23 with the pairs extending radially diametrically oppositely from the axle and the ears in each pair in alignment longitudinally of the axle. Each pair of ears 58 rotatably mounts a cross cut release blade mounting rod 59, each having an angular trip arm 60 secured thereto extending radially therefrom at opposite ends of the respective mounting rod 59. Each of the trip arms 60 is provided with a right angularly extending engaging lip 61. As will soon become apparent, the lips of the trip arms have alternate paths of travel.

In one path of travel of the trip arm 60 on the forwardly located mounting rod 59, the engaging lip 61 engages the release roller 40 moving it downwardly and releasing the latched check scraper latch plate 27 and its respective check scraper blade 25 to deposit a check in a furrow. In its other path of travel, the forward trip arm 60 is temporarily detained in its rotative movement by providing a bracket 62 extended upwardly from each of the support arms 20 each mounting a detaining roller 63.

A pair of cross cut release arms 64 are welded or otherwise secured at their inner ends to each mounting rod 59 and extended radially outwardly therefrom in a common plane with a release plate 65 secured as by bolting between the outer ends of each pair of release arms 64. A cross cut blade mounting pintle 66 is secured between the release arm 64 closely parallel to each mounting rod 59. A tube 67 is rotatably mounted along the length of each mounting pintle 66 with a cross cut scraper blade 68 weldably secured at its inner edge to a respective tube 67 extended radially outwardly therefrom. It will be noted that each release plate 65 terminates at its outer edge a greater distance from its respective mounting rod 59 than the termination of the outer edge of its respective cross cut scraper blade 68, the purpose of which will hereinafter become fully apparent. It will also be noted in Fig. 1 of the drawing that one end of each cross cut scraper blade 68 overlaps the inner edge of its respective cooperating check scraper blade 25. During the operation of the device an overlapping end of the cross cut scraper blade 68 engages the front surface of its respective downwardly extending latched check scraper blade 25 to detain the cross cut scraper blade in a scraping position while thus in engagement with its check scraper blade.

Figure 2:
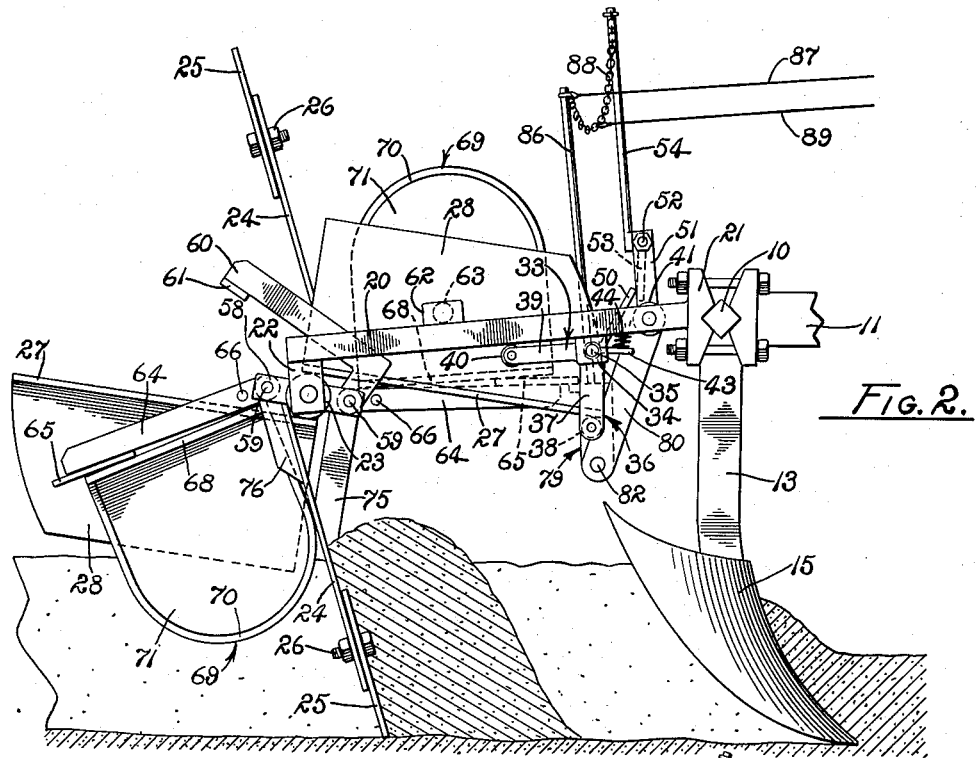
Fig. 2 is a side elevation of the furrow checker showing one of the check forming blades in its position for scraping and accumulating soil for deposit as a dam in a furrow.
Figure 3:
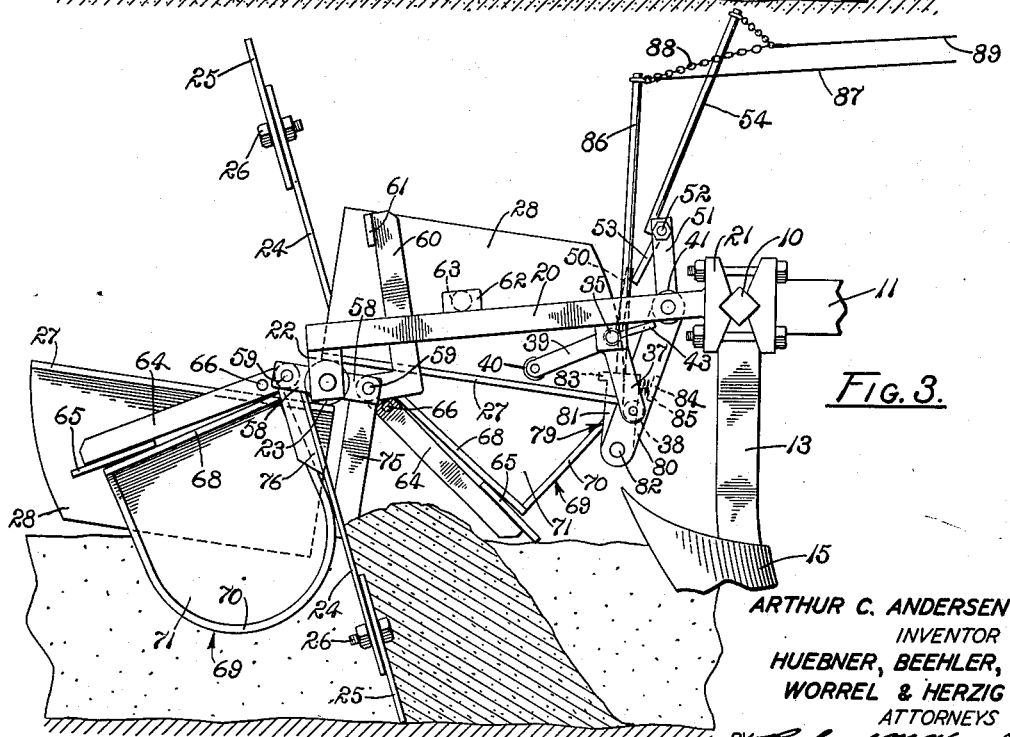
Fig. 3 is a view similar to Fig. 2 showing both the check forming blade and a cross cut forming blade released for forming a cross cut on the downhill side of a check as when the implement is moving downwardly of a slope.

In order that each cross cut blade 68 may be held in an elevated position above the ridge between adjacent furrows while located rearwardly of the axle 23, a skid 69 is secured to what is then the underside of each cross cut scraper blade. Each skid is formed with a U-shaped length of strap iron 70 which is welded at its ends to its respective cross cut scraper blade 68 with a D-shaped filler plate 71 welded in covering relation against one face of the strap iron and its straight edge weldably secured to the cross cut scraper blade. As illustrated in Figs. 2 and 3 of the drawing, the rearwardly located cross cut scraper blade 68 is held in an elevated position by its respective skid 69 resting in an adjacently formed furrow.

One of each pair of ears 58 extends toward one face of a check scraper plate 24 in the form of a brace 75 and is welded thereto. The other of each pair of ears 58 continues in a web 76 near the inner edge of each check scraper plate 24 and is welded thereto for re-enforcing purposes.

Each of the cross cut scraper blades 68 is retained alternately in a substantially horizontally forwardly extending position while its cooperating check scraper blade 25 is maintained in a downwardly extending scraping position, by providing a cross cut blade latching mechanism 79 which engages an outer edge of each cross cut scraper blade 68 to retain it in this position. The cross cut blade latch mechanism is provided with a pair of laterally spaced latch supports 80 which are anchored at their upper ends to the mounting rod 41 and extend downwardly and slightly rearwardly therefrom with a latch member 81 pivoted at 82 at the lower terminal end of the latch supports and extended upwardly therefrom. The latch member is provided with a rearwardly extending overhang 83 by which the release plate 65 of each cross cut scraper blade 68 is engaged for retaining the cross cut scraper blade in a forwardly extending elevated position. The latch member 81 is maintained in effective extended position to be engaged by a release plate 65 by providing a backing plate 84 welded between the latch supports 80 with a helical compression spring 85 located under initial compression between the latch member and the backing plate. The latch member 81 is movable forwardly to release a retained release plate 65 and its cross cut scraper blade 68 by welding the inner end of a trip rod 86 to the upper end of the latch member extending substantially vertically upwardly therefrom.

The furrow checker is operable to form checks in furrows and cross cuts in the ridge between furrows by moving the trip rods 54 and 86 in a forward direction. Where it is desired to form a cross cut in the ridge between furrows on the near side of the check formed in the furrow thereby, the cross cut blade trip rod 86 only is moved forwardly. A cable 87 is attached at its rearward end to the upper end of the trip rod 86 and extends forwardly to a position where it is manually manipulable. When it is desired to form a cross cut on the far side of a check formed thereby both the check blade trip rod 54 and the cross cut blade trip rod 86 are manually moved forwardly releasing both the downwardly extending check scraper blade 25 and its cooperating forwardly extending cross cut scraper blade 68 and release plate 65. Both of the trip rods 54 and 86 are tripped simultaneously by securing the ends of a chain 88 to the upper ends of the trip rods with a cable 89 secured at its rearward end to a midpoint on the chain. The cable 89 extends forwardly to a position where it may be manually pulled for manipulation of both of the trip rods 54 and 86.

Operation

The operation and utility of the present invention are believed to be apparent from the foregoing description and are briefly summarized at this point. A first position of the furrow checker is illustrated in Figs. 1 and 2 of the drawing, in which one of the check scraper blades 25 is maintained in a downwardly and somewhat forwardly angled position for the accumulation of a quantity of soil to be deposited in the form of a check in its respective furrow. The check scraper blade is maintained in this position by its respective cooperating forwardly extending latch plate 27 in engagement with its respective retaining roller 38. In this position a forwardly extending release plate 65 is engaged by the cross cut blade latch mechanism 79 holding the release plate and its cross cut scraper blade 68 supported thereby in a substantially horizontal elevated position. Also in this position, as the furrow checker is moved forwardly, the skid 69 of a rearwardly extending cross cut scraper blade 68 rides in a furrow formed by a furrow checker maintaining the cross cut scraper blade in an elevated position, as illustrated in Fig. 2. With the furrow checker in this position, accumulating soil ahead of the downwardly extending check scraper blade 25, the operator may selectively form a cross cut in the ridge between the furrows either on the near side or the far side of the check formed by depositing the accumulated soil on release of the downwardly extending check scraper blade.

In the instance where the furrow checker is forming checks and cross cuts while moving in a downhill direction it is desirable to form the cross cut on the far side or downhill side of the check formed in a furrow, as illustrated in Fig. 7 of the drawing. To accomplish this, both of the trip rods 54 and 86 are manually moved forwardly by pulling forwardly on the cable 89 and chain 88 which releases both the check scraper latch mechanism 33 and the cross cut blade latch mechanism 79. This causes the previously latched and elevated forwardly extending release plate 65 and cross cut scraper blade 68 to pivot downwardly into supporting relation on the ridge between the furrows, as illustrated in Fig. 3, while the downwardly extending check scraper blade 25, although released to pivot rearwardly, is in substantially the same position as in Fig. 2. It will be noted that the forwardly extending release plate 65 and its contacting cross cut scraper blade 68 falls to the far side of the soil accumulated ahead of the downwardly extending check scraper blade. Thus the cross cut formed by the cross cut scraper blade will be on the downhill side of the accumulated soil when it is deposited in the form of a check.

Figure 4:
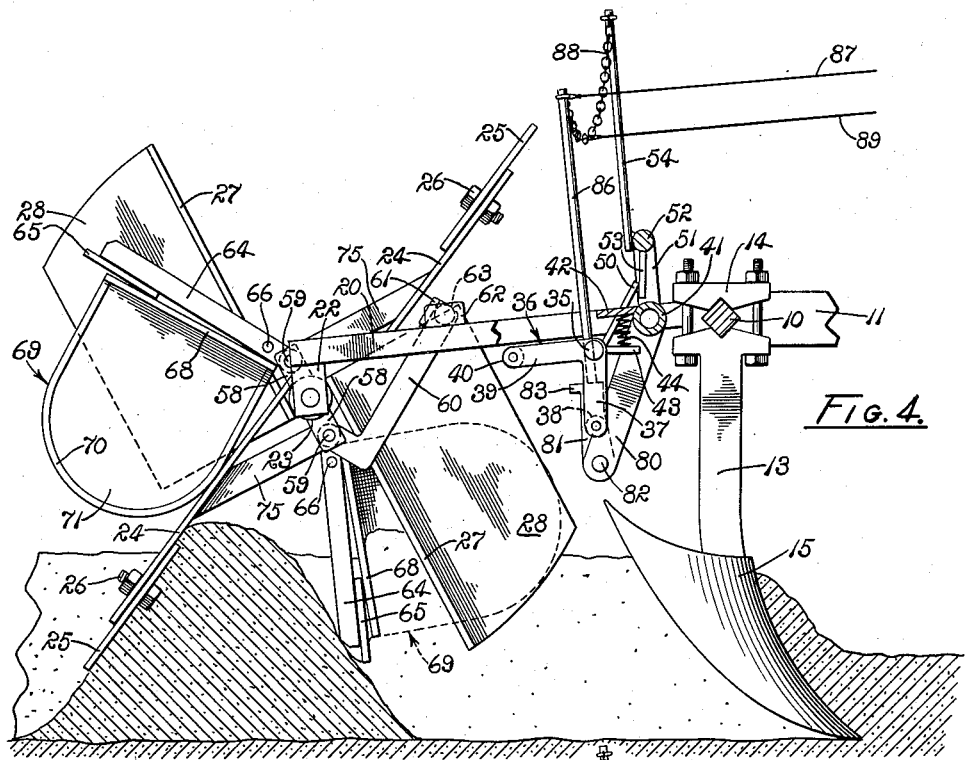
Fig. 4 is an additional view similar to Fig. 2 showing both the check forming blade and the cross cut forming blade rotated rearwardly as in depositing a check in a furrow and initiating the forming of a cross cut between furrows on the downhill side of the check as the implement moves downwardly of a slope.

As the furrow checker moves forwardly from the position shown in Fig. 3, the released members of the furrow checker rotate in soil contact to the position shown in Fig. 4. In this position the check scraper blade 25 is about to deposit the accumulated soil in the form of a check and the engaging lip 61 on the forwardly extending trip arm 60 has engaged its respective detaining roller 63. As long as the trip arm is in engagement with the detaining roller 63, the downwardly positioned release plate 65 and its cross cut scraper blade are maintained in scraping position to form a cross cut between furrows. While the cross cut scraper blade is held in scraping position, the downwardly extending released check scraper blade 25 continues to rotate rearwardly on forward motion of the device. This rearward pivoting of the downward check scraper blade also causes downward and rearward rotation of the mounting rod 59 of the downward cross cut scraper blade. After the downward check scraper blade has rotated rearwardly sufficiently, the mounting rod 59 is rotated sufficiently around the axle that the engaging lip 61 on the forwardly projecting trip arm 60 becomes disengaged from the detaining roller. This is affected after the cross cut blade has been detained sufficiently to form a cross cut between furrows for the flow of irrigation water therebetween.

In instances where checked furrows are formed while the implement is moving along an uphill grade, the cross cut is formed on the near side of each check, as illustrated in Fig. 8 of the drawing. This is accomplished by manually releasing only the cross cut blade latch mechanism 79, as illustrated in Fig. 5 of the drawing. Releasing the cross cut blade latch mechanism permits a forwardly positioned elevated release plate 65 and cross cut scraper blade 68 to gravitate pivotally downwardly in supporting relation on the ridge between furrows. Further forward motion of the implement causes the release plate and cross cut scraper blade to pivot downwardly into the soil of the ridge until the overlapping end of the cross cut scraper blade contacts the unreleased downwardly positioned check scraper blade 25 which holds the cross cut scraper blade from pivoting further rearwardly. It will be noted in Fig. 5 that the engaging lip on the forwardly extending trip arm 60 moves concentrically around the axis of its release plate mounting rod avoiding engagement with its respective detaining roller 63. With the cross cut scraper blade in engagement with the forward side of the unreleased downwardly extending check scraper blade, further forward movement of the implement causes the cross cut scraper blade to form a cross cut between furrows while the check scraper blade continues to accumulate soil at its forward side for subsequent deposition to form a check. Also further forward movement of the implement causes the free downwardly directed release plate 65 to pivot rearwardly because of the soil engagement. After the release plate has pivotally rearwardly to the position shown in Fig. 6, the engaging lip 61 on the trip arm 60 engages its respective release roller 40. Further rearward pivoting of the release plate causes the trip arm to pivot the bell crank 36 releasing the check scraper latch mechanism 33. This permits both the downward check scraper blade 25 and the cross cut scraper blade 68 to pivot rearwardly depositing a check across the furrow beyond the cross cut formed transversely of the ridge between the furrows.

In the formation of checks and cross cuts on both a down grade and an up grade, release of both the check scraper latch mechanism and the cross cut blade latch mechanism or only the cross cut latch mechanism is manually effected as desired. When manually initiated, the complete cycle to form a single check and cross cut is fully automatic. The operator need only to determine the grade and spacing of the checks and cross cuts and manipulate the cables 87 and 89 to form checks in alternate furrows with the cross cut between furrows selectively either on the near or far side of the checks formed in the furrows.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. An agricultural implement for forming checked and cross cut furrows comprising a supporting frame mounted for predetermined directional movement; a pair of furrowing shovels supported on the frame in spaced relation transversely of the direction of movement; an axle rotatably journaled on the frame rearwardly of the shovels and extending axially transversely of the direction of movement of the structure; a pair of check scraper blades secured to the axle, each extending diametrically oppositely of the other radially from the axle and one check blade located along the axle in symmetrical alignment rearwardly of each furrowing shovel; a pair of check latch plates secured to and extending radially and diametrically oppositely from the axle; a pair of check latch means each including a bell crank member pivotally mounted on the supporting frame comprising a downwardly depending leg having a stop roller mounted at its lower end and a rearwardly horizontally extending leg having a release roller mounted at its extended end; spring means urging the bell crank rotatably downwardly and rearwardly, the stop roller being adapted to be engaged by successive check latch plates to retain its respective check scraper blade in downwardly extended scraping position; a pair of cross cut blades pivotally mounted on and adjacent to the axle being axially parallel thereto at diametrically opposite radial sides of the axle, each cross cut blade overlapping a check blade; a release plate pivotally mounted on the axle, axially parallel thereto at the downward rearward side of each cross cut blade and extending radially outwardly from the axle a greater distance than its respective cross cut blade; a pair of retaining rollers mounted on the supporting structure adjacent opposite ends of the axle; and a trip arm rotatable with each release plate for unitary pivotal movement therewith whereby upon rotation about the axle the trip arms have alternate paths of travel dependent upon their pivotal positioning during rotation, the release rollers and the retaining rollers being located in alternate paths of movement of their respective trip arms for engagement therewith.

2. A furrowing and checking implement comprising a support frame mounted for predetermined directional movement; a plurality of laterally spaced furrowing shovels mounted on the frame for earth engagement; an axle mounted transversely in the frame; a pair of check scraper blades oppositely extended from the axle individually in alignment in the direction of movement of the frame with respective furrowing shovels; a pair of latch plates extended from the axle intermediate the scraper blades, said latch plates and scraper blades being interconnected for unitary rotational movement; a pair of release plates pivotally mounted on the axle in radially spaced relation thereto and radially extended therefrom intermediate the scraper blades; a trip arm mounted for unitary pivotal movement with each release plate in predetermined angular relation to its respective release plate; a cross cut scraper blade pivotally mounted on each of the release plates for movement about an axis in substantially parallel adjacent relation to the axle, the cross cut scraper blade being radially extended a distance less than the release plate and being of a length adapted to engage a respective check scraper blade; a manually controlled latch member mounted in the frame engageable with the release plates to retard pivotal movement thereof, the trip arm having a first orbit of travel defined by releasing said trip arm's release plate concurrently with release of its corresponding latch plate and a second by releasing said trip arm's release plate in advance of release of the corresponding latch plate; a stop mounted in the frame in the first orbit of travel of the trip arm for engagement therewith when said trip arm's respective release plate and cross cut scraper blade are in downwardly extended position; a retainer pivotally mounted in the frame for successive engagement with the latch plates to interrupt rotational movement of the axle with a check scraper blade downwardly extended for earth accumulation and movable to free the latch plates for rotation of the axle in response to drag on a check scraper blade; a release arm extended in fixed relation to the retainer into the second path of travel of the trip arm whereby the trip arms in traversing their second orbit of travel releases the retainer; and a means for optionally releasing the catch member and the retainer together and the catch member alone.

3. In an agricultural implement, an elongated axle rotatably mounted for earth traversing movement in a substantially horizontal attitude in a direction transversely of its length; a pair of check scraper blades mounted in longitudinally spaced relation on the axle for unitary rotational movement about the axle in response to earth engagement, the blades being oppositely extended from the axle for alternate earth engagement; a plate latch individual to each scraper blade radially extended from the axle in following relation to its respective blade during rotation; a pair of latch members mounted for latch plate engagement to interrupt rotational movement of the blades and plates with each plate's respective blade in earth engagement; a pair of cross check blades mounted for pivotal movement on the axle adjacent to each of the latch plates intermediate the scraper blades, each being extended endwardly of the axle to overlay a respective scraper blade; a skid rearwardly extended from each cross cut blade relative to the direction of rotation of the blades and plates engageable with the check scraper blade in following relation thereto; a release plate pivotally mounted adjacent to each of the cross cut blades in leading relation thereto adapted to pass the adjacent scraper blade and extended from the axle radially beyond its respective cross cut blade, each of said release plates having a trip arm borne in fixed angular relation thereto; a latch member mounted for releaseable engagement with the release plates whereby the trip arms are provided with alternate orbits of travel in response to rotation of the plates and blades about the axle, a first orbit defined by releasing said trip arm's release plate concurrently with release of its corresponding latch plate and a second by releasing said trip arm's release plate in advance of release of the corresponding latch plate; a pair of detaining members mounted in said first orbits of travel of the trip arms; means extended from the plate latch into the second orbit of travel of the trip arms whereby the plate latch is released in response to such travel; and manual control means selectively operable concurrently to release the plate latch and latch member and individually to release the latch member.

4. A furrowing and checking implement comprising a support frame mounted for predetermined directional movement; a plurality of laterally spaced furrowing shovels mounted on the frame for earth engagement; an axle mounted transversely in the frame; a pair of check scraper blades oppositely extended from the axle individually in alignment in the direction of movement of the frame with respective furrowing shovels; a pair of latch plates extended from the axle intermediate the scraper blades, latch plates and scraper blades being interconnected for unitary rotational movent; a pair of rods mounted for unitary rotational movement with the axle in spaced parallel relation thereto intermediate the extended scraper blades; a release plate pivotally mounted on each rod and radially extended therefrom adapted to pass between the scraper blades; a trip arm pivotally mounted on each rod in predetermined angular relation to its respective release plate; a cross cut scraper blade pivotally mounted on each of the release plates for movement about an axis in substantially parallel adjacent relation to said plate's respective rod; the cross cut scraper blade being radially extended a distance less than the release plate and being of a length adapted to engage check scraper blades on opposite sides thereof; a manually controlled latch member mounted in the frame engageable with the release plates to retard pivotal movement thereof; the trip arms having a first orbit of travel defined by releasing said trip arm's release plate concurrently with release of its corresponding latch plate and a second orbit of travel by releasing said trip arm's release plate in advance of release of the corresponding latch plate; a stop mounted in the frame in the first orbit of travel of the trip arm for engagement therewith when said trip arms respective release plate and cross cut scraper blade are in downwardly extended position; a retainer pivotally mounted in the frame for successive engagement with the latch plates to interrupt rotational movement of the axle with a check scraper blade downwardly extended for earth accumulation and moveable to free the latch plates for rotation of the axle in response to drag on a check scraper blade; release arms extended in fixed relation to the retainer into the second path of travel of the trip arms whereby the trip arms in traversing their second orbit of travel release the retainers; and a manual means for simultaneously releasing the catch member and the retainer including a portion operable individually to release the catch member.

5. In an agricultural implement for forming checked and cross cut furrows, the combination of a support frame mounted for predetermined directional earth traversing movement, an axle rotatably mounted in the frame transversely of the direction of movement, a pair of check scraper blades rigidly mounted on the axle substantially diametrically oppositely extended therefrom, a pair of check scraper latch plates rigidly mounted on the axle and substantially radially extended therefrom intermediate the check scraper blades, the check scraper blades and check scraper latch plates having individual paths of movement respectively about the axle incident to axle rotation, check scraper latch means pivotally mounted in the frame for reciprocal movement between a position in the path of travel of the latch plates and a retracted position removed therefrom, resilient means urging the latch means into the path of travel of the latch plates, a pair of release plates pivotally mounted on the axle for movement about axes in parallel spaced relation to the axle on opposite sides thereof, a second latch means mounted in the frame for reciprocal movement between a position engageable with the release plate during axle rotation and a position retracted therefrom, a cross cut scraper blade pivotally mounted on each of the release plates and rearwardly engageable with their respective release plates, a trip arm rigidly extended from each release plate in following relation thereto, said trip arm having alternate paths of travel upon axle rotation dependent upon pivotal positioning of the release plates and trip arms on the axle, a check scraper releasing arm connected to the check scraper latch means and extended into one of the paths of travel of the trip arm, a detaining roller fixedly mounted on the frame in the alternate path of travel of the trip arm, and manual means for selectively retracting the first latch means and both latch means.

6. An agricultural implement for forming checked and cross cut furrows comprising a supporting frame mounted for predetermined directional movement; a pair of furrowing shovels supported on the frame in spaced relation transversely of the direction of movement; an axle rotatably journaled on the frame rearwardly of the shovels and extending axially transversely of the direction of movement of the structure; a pair of check scraper blades secured to the axle, each extending substantially oppositely of the other radially from the axle and there being a check blade located along the axle in symmetrical alignment rearwardly of each furrowing shovel; a pair of check latch plates secured to and extending radially and diametrically oppositely from the axle; a pair of check latch means mounted on the supporting frame for independent reciprocal movement between positions adapted to be engaged by individual check latch plates to retain its respective check scraper blade in downwardly extended scraping position and retracted position; releasing means individual to the check latch means; a pair of cross cut blades pivotally mounted on and adjacent to the axle being axially parallel thereto at diametrically opposite radial sides of the axle, each cross cut blade overlapping a check blade; a release plate pivotally mounted on the axle, axially parallel thereto at the downward rearward side of each cross cut blade and extending radially outwardly from the axle a greater distance than its respective cross cut blade; retaining means mounted on the supporting structure adjacent to opposite ends of the axle; and a trip arm integral with each release plate having unitary pivotal movement therewith whereby upon rotation about the axle the trip arms have alternate paths of travel dependent upon their pivotal positioning during rotation, the release means and the retaining means being located in alternate paths of movement of their respective trip arms for engagement therewith.

ARTHUR C. ANDERSEN.

References Cited in the file of this patent
UNITED STATES PATENTS

| Number | Name | Date |
|--------|------|------|
| 1,184,329 | Dennis et al. | May 23, 1916 |
| 1,397,722 | Chewning | Nov. 22, 1921 |
| 1,503,626 | Belsley | Aug. 5, 1924 |
| 1,507,218 | Trapnell | Sept. 2, 1924 |
| 2,220,659 | Petzaldt | Nov. 5, 1940 |
| 2,512,363 | Moore | June 20, 1950 |